3,565,890
NOVEL DI-ARYLENE AZOLYL-STYRENE COMPOUND AND THE USE THEREOF

Toshiki Tanaka, Wakayama, Japan, assignor to Nippon Chemical Works Co., Ltd., Wakayama, Japan, a corporation of Japan
No Drawing. Filed Mar. 30, 1964, Ser. No. 355,899
Claims priority, application Japan, Apr. 10, 1963, 38/18,862; June 7, 1963, 38/29,707
Int. Cl. C07d 85/48
U.S. Cl. 260—240                                              7 Claims

ABSTRACT OF THE DISCLOSURE

This invention relates to novel di-arylene azolyl-styrene compounds having at least one higher alkyl radical. This invention also relates to the processes for using said compounds as an optical brightening agent.

---

The new compounds of the di-arylene azolyl-styrene series, to which reference is made in this invention, may be represented by the following general formula:

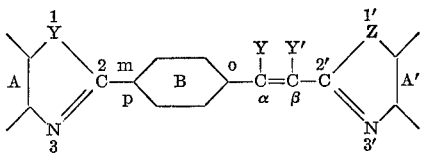

wherein A and A', same or different, stand for substituted or unsubstituted, benzene or naphthalene nucleus which is fused to an adjacent azole ring, said nucleus having no sulphonic or carboxylic acid group; B stands for substituted or unsubstituted benzene nucleus which has no sulphonic or carboxylic acid group; X and Z, same or different, individually, stand for O, S or NR (in which R means H, or alkyl, aryl or aralkyl) and when either one of X and Z is NR, the other is O or S; and, Y and Y', same or different, stand for H, halogen or alkyl, said di-arylene azolyl-styrene compound having one or more higher alkyl radicals in the aromatic portions of its molecule.

The di-arylene azolyl-styrene compounds of the above general formula are characterized by having in the molecule two same or different arylene azole rings which are bridged with a styryl group. With respect to substituents for the aromatic radicals of the compounds of this invention, it is to be noted that these compounds should be free from salt-forming or water-solubilizing groups, such as sulphonic or carboxylic acid group. Further, the compounds of this invention should not contain any group capable of imparting dye character to the compounds, for example, like azo group. However, other groups than those specified above may be present as substituents in the aromatic radicals of the compounds, inasmuch as these substituents do not cause undesired modification in physical and chemical nature of the compounds. Typical substituents include halogen, and alkyl, aryl, aralkyl, fluoroalkyl, cycloalkyl, alkoxy, aralkoxy, cyano and nitro groups. If desired, the substituents may be selected from substituted hydrocarbons, e.g. those containing cyano, hydroxy, sulphonyl or carbonyl group and those containing ethereal or amino linkage. The most important characteristic of the di-arylene azolyl-styrene compounds of the above general formula is the existence of one or more higher alkyl radicals attached to the aromatic portions of the said compounds.

This invention has been attained from the extensive examination of these alkyl radicals with respect to their presence or absence, and their type and number, if they are present in the molecule of the compounds of this invention. Particularly, the examination has led us to the knowledge that, when the di-arylene azolyl-styrene compounds of the above general formula have one or more higher alkyl radicals attached to the aromatic portions of the compounds of this invention, there occur some appreciable changes in the properties of the compounds of this invention, such as the melting point, the solubility and dispersibility in solvents, and the performances when they are applied to materials, e.g. the affinity, fastness and color shades. Consequently, it has resulted in the discovery of these properties of the compounds which have one or more higher alkyl radicals attached to the aromatic portions of the compounds.

With respect to the di-arylene azolyl-styrene compounds of the above general formula, when one or more substituents attached to the aromatic portions in the molecule are optionally selected from the higher alkyl radicals which include butyl, octyl, nonyl and dodecyl radicals, the compounds having said radicals generally exhibit a lower melting point than those having radicals selected from the lower alkyl radicals which include methyl, ethyl and propyl radicals, therefore the former compounds being singly used for synthetic resins. Further, the former compounds have high solubility into suitable solvents. Still further, the compounds show high dispersibility when used in admixture with surfactants, therefore they may be advantageously applied to fibers due to their dispersibility. Moreover, the compounds have improved affinity with highly hydrophobic materials, such as polypropylene-made materials.

Accordingly, when the optional selection is made among the compounds of the above general formula basing on the type and number of the alkyl radicals attached to the aromatic portions in the molecule, the relation between the aromatic and the aliphatic characters of the compounds may be examined more definitely. Particularly, in case of using the compounds of this invention, since the most suitable of the compounds may be selected according to the type and properties of various organic materials as applied to, the application of the compounds to the materials is the most rational and advantageous.

The di-arylene azolyl-styrene compounds having the higher alkyl radicals as specified in this invention are all novel compounds, which may be prepared by the following procedures. Namely, the preparatory processes are classified into two groups. The processes of the first group comprise condensing [arylene azolyl-(2)]-cinnamic acids of the following formula

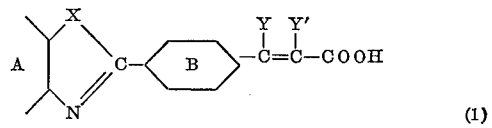

(1)

wherein A, X, B, Y and Y', individually stand for the same as defined in the above general formula, with the aromatic amino compounds of the formula

(2)

wherein A' and Z individually stand for the same as defined in the above general formula and ZH and NH₂ stand for groups positioned in the ortho relation on the nucleus. The processes of the second group for the preparation of the di-arylene azolyl-styrene compounds of this invention comprise condensing 4-carboxy-cinnamic acids of the formula

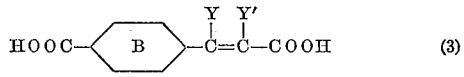

(3)

wherein B, Y, and Y' individually stand for the same as defined in the above general formula, with the aromatic amino, compounds (exclusive of O-diamines).

The important fact in the above preparatory processes is that, when the compounds which may be represented by the Formulae 1, 2 and 3 and have higher alkyl radicals attached to the aromatic radicals A, B and A' are optionally selected for the reaction, the compounds of the above general formula which correspondingly have the higher alkyl radicals can be obtained.

The condensation reactions in the above processes are easily effected by raising a temperature up to about 250° C. However, the reactions may be carried out in any other suitable manner, if desired. That is, for the purpose of reducing a reaction temperature, of shortening the reaction period or of improving the reaction yield, the reactions may be effected in an non-oxidizing atmosphere whether an inert gas, such as $CO_2$ gas or nitrogen gas, is present or absent. Further, they may be effected in the presence of an optimum amount of a suitable dehydrating agent, such as zinc chloride, phosphoric acid and boric acid. Still further, they may be effected in an inert organic solvent, such as ethylene glycol, higher alcohols, diphenyl and diphenyl-ether. Although these condensation reactions are those between carboxylic acids with aromatic amines, carboxylic acids of the above Formulae 1 and 3 may be displaced with the corresponding carboxylic acid derivatives, such as acid chlorides, acid amides and acid esters thereof, thereby to produce the desired product.

The typical compounds used in the above processes which may correspond to the Formula 1 include the following:

p-[benzoxazolyl-(2)]-cinnamic acid
p-[5-methyl-benzoxazolyl-(2)]-cinnamic acid
p-[5-methoxy-benzoxazolyl-(2)]-cinnamic acid
p-[5-chloro-benzoxazolyl-(2)]-cinnamic acid
p-[5,7-dimethyl-benzoxazolyl-(2)]-cinnamic acid
p-[5,6-dimethyl-benzoxazolyl-(2)]-cinnamic acid
p-[5-iso-butyl-benzoxazolyl-(2)]-cinnamic acid
p-[5-phenyl-benzoxazolyl-(2)]-cinnamic acid
p-[5-iso-octyl-benzoxazolyl-(2)]cinnamic acid
p-[5-iso-nonyl-benzoxazolyl-(2)]-cinnamic acid
p-[benzthiazolyl-(2)]-cinnamic acid
p-[6-methyl-benzthiazolyl-(2)]-cinnamic acid
p-[4,6-dimethyl-benzthiazolyl-(2)]-cinnamic acid
p-[4,6-dimethyl-benzothiazolyl-(2)]-o-methyl-cinnamic acid
p-[6-methoxy-benzthiazolyl-(2)]-cinnamic acid
p-[6-chloro-benzthiazolyl-(2)]-cinnamic acid
p-[benzimidazolyl-(2)]-cinnamic acid
p-[1-methyl-benzimidazolyl-(2)]-cinnamic acid
p-[5-methyl-benzimidazolyl-(2)]-cinnamic acid
p-[1-methyl-5-iso-octyl-benzimidazolyl-(2)]-cinnamic acid The compounds corresponding to the Formula 2 typically include the following:

1-amino-2-hydroxy-benzene
1-amino-2-hydroxy-5-methyl-benzene
1-amino-2-hydroxy-4-methyl-benzene
1-amino-2-hydroxy-5-iso-butyl-benzene
1-amino-2-hydroxy-5-iso-octyl-benzene
1-amino-2-hydroxy-5-iso-nonyl-benzene
1-amino-2-hydroxy-3,5-dimethyl-benzene
1-amino-2-hydroxy-5-methoxy-benzene
1-amino-2-hydroxy-5-ethoxy-benzene
1-amino-2-hydroxy-5-phenyl-benzene
1-amino-2-hydroxy-4-chloro-benzene
1-amino-2-hydroxy-5-nitro-benzene
2-amino-thiophenol
2-amino-5-methyl-thiophenol
1-amino-2-monomethylamino-benzene
1,2-diamino-benzene The typical compounds corresponding to the Formula 3 include the following:

4-carboxy-cinnamic acid
2-methyl-4-carboxy-cinnamic acid
2-ethyl-4-carboxy-cinnamic acid
2-propyl-4-carboxy-cinnamic acid
2-iso-butyl-4-carboxy-cinnamic acid
3-methyl-4-carboxy-cinnamic acid
2,5-dimethyl-4-carboxy-cinnamic acid
2-chloro-4-carboxy-cinnamic acid
3-chloro-4-carboxy-cinnamic acid
2-bromo-4-carboxy-cinnamic acid
2,5-dichloro-4-carboxy-cinnamic acid
2-chloro-5-methyl-4-carboxy-cinnamic acid
2-methoxy-4-carboxy-cinnamic acid
3-methoxy-4-carboxy-cinnamic acid
2-cyano-4-carboxy-cinnamic acid These compounds the names of which are specified above are only informative and they are not to be construed as limiting the scope of the invention. They are optionally selected as the starting materials for the preparatory processes depending on their availability, the properties of intended products or the like.

The di-arylene azolyl-styrene compounds having one or more higher alkyl radicals which are used in the present invention are white or pale yellow crystalline powder. They are slightly soluble in an organic solvent, such as methanol, ethanol, chlorobenzene, pyridine or dimethyl formamide and are hardly soluble in water. The solutions of the di-arylene azolyl-styrene compounds exhibit strongly bluish fluorescence under ultraviolet ray or sunlight. These compounds and their solutions are extremely stable against physical and chemical attacks, such as heat, light or the like. Therefore, the compounds used in this invention may be applied as they are, or in the form of a solvent solution or of an aqueous dispersion. In this case, especially with respect to various fibers, it is generally advantageous to use the compounds of this invention in aqueous dispersion in the acidic, neutral or alkaline state. If desired, they may be used together with surfactants, carriers, oxidizing agents or other suitable assistants or in admixture with other optical brightening agents, dyestuffs, pigments or finishing agents. Particularly for various resins, the compounds of this invention may be used singly or in combination with various additives in the manner known per se, for example, use in the form of a dry blend or master batch or painting method. Further, they may be added to the starting materials or monomers for the preparation of various resins or at any stage in the process for the synthesis or manufacture of various resins. Thereby, there may be obtained resin products which excel in the transparency, whiteness, clearness, and fastness against light or other attacks.

The affinity of the compounds of the above general formula with various organic materials shows appreciable variation depending on the type and nature of the materials as applied to. However, their amount of about 0.001–0.05% generally is sufficient. Too much an amount, if used, does not cause the disadvantages, such as staining and coloring. Therefore, it will be understood that the compounds of this invention may be applied to various organic materials at the optional stage before or during or after the shaping thereof.

As apparent from the preceding description, the di-arylene azolyl-styrene compounds of the above general formula which have the higher alkyl radicals in the aromatic portions of the molecule may be applied to various organic materials. Such organic materials typically include naturally occurring oils, fats, waxes and resins; the derivatives of said materials, e.g. soap, fatty acids, alcohols and esters;

the synthetic organic materials, e.g. cellulose, cellulose acetate, and celluloid; and naturally occurring and synthetic gums. Further, they include various organic compounds, including commonly known synthetic resins, e.g. the resins derived from phenol, alkyd, urea, melamine, vinyl chloride, vinyl acetate, vinyl alcohol, vinyl acetal, ethylene, propylene, styrene, acrylonitrile, urethane, ethylene terephthalate, acrylic acid ester and methacrylic acid ester and silicon resin; the synthetic fibers prepared from these resins; various other artificial or synthetic fibers, e.g. acetate fibers, Vinyon P.G., Rhovyl, Salan, Belon, Vinylon, Orlon, Dynel, Chemistrand, nylon, Tetron, polypropylene fibers and the like, which may be modified by a suitable way. In addition, starting materials or intermediate products for the preparation of synthetic resins and synthetic resin products are also enumerated as the materials which may be subjected to the application of the compounds of this invention.

The present invention will be illustrated with reference to the following examples, wherein parts and percentages are expressed by weight.

EXAMPLE 1

One hundred and ninety two parts of 4-carboxycinnamic acid, 450 parts of 1-amino-2-hydroxy-5-isooctylbenzene and 200 parts of boric acid are thoroughly mixed. The resultant mixture is heated at a temperature of 150°–170° C. for 2 hours and then at a temperature of 170°–200° C. for 3 hours. The resultant product is cooled, pulverized, and then heated together with a dilute caustic soda solution to have unreacted material removed, followed by washing with water and drying. The product is again pulverized and purified with dimethyl formamide to prepare a substantially white crystalline product of M.P. 202°–204° C. (uncorrected). This compounds is p,β-di-[5-iso-octyl-benzoxazolyl-(2),(2′)] - styrene and is represented by the formula

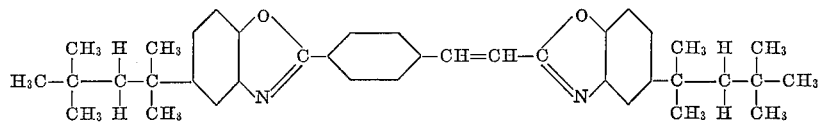

This compound is hardly soluble in water but is soluble in alcohol, pyridine, dimethyl formamide or the like to show blue violet fluorescence under ultraviolet ray. The compound is gradually added in an amount of 0.005% directly to the melt of polypropylene resin at about 200°–300° C. to be easily dispersed or dissolved into said resin. Then, the treated resin is spun or shaped by the conventional processes into a product not only very finely optically brightened but also having fastness against light or the like attacks.

A compound having the similar structure to that of the afore-mentioned compound with exception that the former has methyl radical instead of octyl radical of the latter, as the radical attached to the arylene portion of the arylene azole ring of the compounds, shows a melting point of 253°–255° C. (uncorrected). Dispersibility or solubility of the octyl-bearing compound into the resin is more rapid and better than the methyl-bearing one. Likewise, the octyl compound may be applied in a similar manner to various synthetic resins, such as polyethylene terephthalate and polyacrylonitrile, with good results.

EXAMPLE 2

0.5 part of the compound shown in Example 1 and 25 parts of polyethylene glycol ether of higher alkyl phenol having HLB 9 are dissolved with heating at about 100° C. and poured into a large amount of warm water to obtain an aqueous dispersion.

This aqueous dispersion is used to treat polypropylene fibers in the conventional method, such as ordinary dip dyeing, high temperature dyeing, carrier dyeing or thermosol dyeing, not only to optically brighten said fibers very finely, but also to impart thereto good fastness against various attacks, especially light. In this case, however, the compound which is the similar structure to that of the above-used compound except that the former compound has methyl radical, instead of the octyl radical, as the radical connected with the arylene radical of the arylene azole rings of their molecule, shows low solubility in said nonionic surfactant of HLB 9, as compared with the latter compound. Surfactants to be used in this method should not be confined to those of HLB 9 and they may be optionally selected from surfactants of various types, such as nonionic, anionic, cationic and amphoteric surfactants. Further, dispersion may be carried out in the conventional manner.

Further, the same or similar procedures may be applied to polyester, acetate, Vinylon, nylon or other similar fibers to obtain same good results.

EXAMPLE 3

0.1 part of the compound of Example 1 is dissolved into 1,000 parts of a suitable solvent, such as alcohol, n-hepane or dimethyl formamide. Then, a polyethylene-made plate is dipped into the resultant solution at more than about 50° C. Then, the plate is withdrawn therefrom and the solvent is vaporized off in a suitable manner to obtain the plate not only finely optically brightened but also having good fastness against various attacks, especially light. In this case, similar results may be also obtained, when the plate is dipped at an ordinary temperature, if necessary. Like the above procedures treating polyethylene, the similar procedures may be applied to various resin materials, such as polypropylene, polyester and polyvinyl chloride, with good results.

EXAMPLE 4

By the procedures similar to those of Example 1, there may be prepared pale yellowish white crystalline product of M.P. 251°–253° C. (uncorrected). This compound is p,β-di-[5-iso-butyl-benzoxazolyl)-(2),(2′)]-styrene and is represented by the formula:

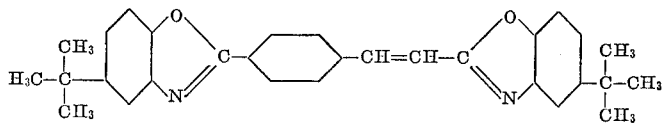

This compound is hardly soluble in water but slightly dissolves into alcohol, dimethyl formamide, pyridine or the like to show blue violet fluorescence under ultraviolet ray.

One part of the compound thus prepared, 10 parts of an anionic surfactant which is prepared from naphthalene sulfonate and formaldehyde and a small amount of water are thoroughly masticated and then dried under decreased pressure to be made into powder for the convenience of the storage and use therof. Then, the powder in such an amount as to contain 0.01%, on the Vinylon fabric basis, of said compound is dispersed together with a desired amount of water into a bath, and the Vinylon fabric is treated at the bath ratio of 1:30 at 50°–100° C. for 30 minutes, washed with water and dried to have a product which is optically finely brightened with good fastness against various attacks, especially light. In this case, the bath may be added, if desired, with suitable additives, such as surfactants, acids, alkalis or the like. If desired, various surfactants or additives may be optionally added for the preparation of the above powder and the amount thereof may be optionally selected.

Further, the procedures similar to the above may be applied to various synthetic fibers, such as nylon, acetates or the like, with similar good results.

EXAMPLE 5

Two hundred and eighty parts of p-[5-methylbenzoxazolyl-(2)]-cinnamic acid, 225 parts of 1-amino-2-hydroxy-5-iso-octyl-benzene and 100 parts of boric acid are thoroughly mixed and added further with 50 parts of ethylene glycol. The resultant mixture is gradually heated until the reaction proceeds at 140°–170° C. for 3 hours and then at 170°–210° C. for 3 hours. Upon completion of the reaction, the resultant product is cooled and then purified in the same manner as in Example 1 to have pale yellowish white crystalline compound of M.P. 232–233° C. (uncorrected). This compound is p-[5-methylbenzoxazolyl-(2)]-β - [5'-iso - octylbenzoxazolyl-(2)]-styrene represented by the formula

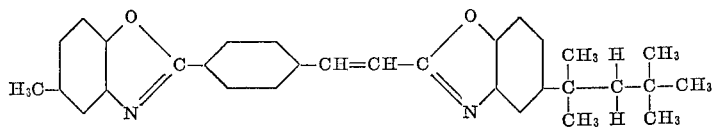

This compound is hardly soluble in water but dissolves slightly into alcohol, pyridine and dimethyl formamide to show blue violet fluorescence under ultraviolet ray.

A mixture of an aqueous dispersion containing said compound with an aqueous solution containing the sodium sulfonate of same compound (which is prepared by treating the compound with fuming sulfuric acid) is applied to optically brighten a cotton-polypropylene fabric in the usual manner. Then, the fabric treated is directly dipped into a treating bath containing a resin processing solution, e.g. of the following formulation, and then squeezed to the solution content of 80% by means of a squeezing machine, pre-dried at 60°–70° C. so that over-drying may be avoided, and then heat-treated at 100°–120° C. for about 10–30 minutes, followed by soaping. The product thus prepared shows good optical brightening effect as compared with the product as prepared without using the compound of the above formula. Further, the former product exhibits preferable feel, crease resistance and water repellency and is not accompanied by any undesired interaction between the compound and the treating resin.

One example of a resin processing solution is shown hereinunder:

Sumitex resin 901 (manufactured by Sumitomo Chemical Co.) _____ 125
Sumibel resin N (manufactured by Sumitomo Chemical Co.) _____ 3
Sumitex accelerator MX (manufactured by Sumitomo Chemical Co.) _____ 3
Triton X-100 (manufactured by Rohm & Haas Co.) _____ 2
Water _____ 867
　　　　　　　　　　　　　　　　　　　　　　　　1000

In this case, the compound of the above formula shows affinity with polypropylene fibers and the sodium sulfonate of same compound shows affinity with cotton. For cotton, an ordinary brightening agent which is resistant against chemical attack raised by resin processing also may be used instead of the said sodium sulfonate.

The similar procedures may be applied to various mixed fibers or fabrics, with similar good results.

EXAMPLE 6

0.005% of the compound of Example 1 is added to monomeric methyl methacrylate and then 0.1% of benzoyl peroxide is added thereto. The resultant mixture is placed in a mold. Polymerization is effected therein at 70° C. for 30 hours. Then, the resulted polymer is annealed at 165° C. for an hour and heat-treated to prepare organic glass product having good transparency. In this case, the product is still more transparent than those prepared in the same manner but without adding the compound of Example 1.

EXAMPLE 7

0.005% of the compound of Example 1 is thoroughly mixed into powdered polystyrene material and uniformly mixed by means of a heat mixing roll at about 150° C. Then, the mixture is molded into a desired shape by means of a rolling or extruding machine to obtain a styrene product having good transparency. In this case, the transparency of the product is still higher than that of the product which is prepared in the similar manner but without using the compound of Example 1.

EXAMPLE 8

One part of the compound of Examples 1 and 2 parts of butyl stearate are well masticated into a paste form and then treated together with pellets of soft polyvinyl chloride at about 180° C. by means of a heat mixing roll. In the above, the compound of Example is added in an amount of 0.005% on the resin basis. The resultant molten resin mixture is cast into a mold or molded into a desired shape by a rolling or extruding machine, to give a polyvinyl resin product having good transparency.

In case of the above blending or mixing, dispersing agents, plasticizers, solvents, curing agents, dyestuffs, pigments or additives, such as titanium oxide of the anatase type, are optionally added to prepare a desired product. The product thus prepared is improved in transparency, whiteness, brightness or fastness against light or other attacks as compared with those prepared without using the present compound.

All the above examples are those wherein the di-arylene azolyl-styrene compounds having higher alkyl radicals, such as a butyl radical and an octyl radical, but the present invention is not to be confined to such radicals. Further, the processes shown in Examples 1 to 8 are several embodiments of the invention wherein various di-arylene azolyl-styrene compounds having higher alkyl radicals in the aromatic portions of the molecule which may be represented by the above general formula are applied to various organic materials to show good optical brightening effect, and the processes for the application of the compound of the above general formula are not to be restricted to Examples 1 to 8.

What I claim is:

1. A di-arylene azolyl-styrene compound of the formula

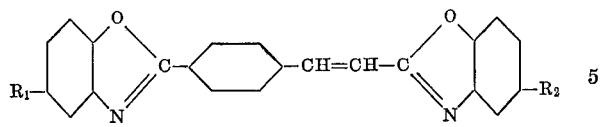

in which each of $R_1$ and $R_2$ represents an alkyl radical having a maximum of 12 carbon atoms and the alkyl radical represented by at least one of said $R_1$ and $R_2$ has at least 4 carbon atoms.

2. A di-arylene azolyl-styrene compound of the formula

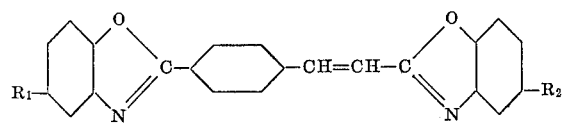

in which one of said $R_1$ and $R_2$ is selected from the group consisting of butyl, octyl, nonyl and dodecyl, and the other of said $R_1$ and $R_2$ is selected from the group consisting of methyl, ethyl, propyl, butyl, octyl, nonyl and dodecyl.

3. A di-arylene azolyl-styrene compound of the formula

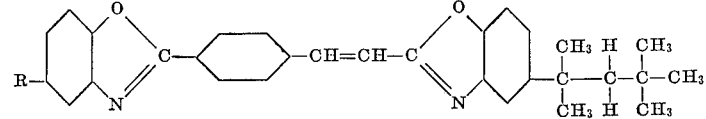

in which R is selected from the group consisting of methyl and iso-octyl.

4. p,β-di-[5-iso-octyl-benzoxazolyl - (2)(2')] - styrene represented by the formula:

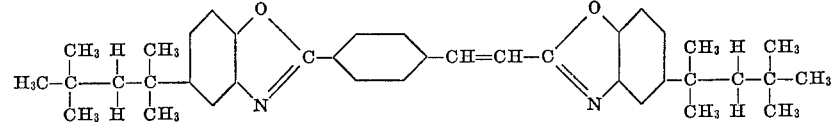

5. p,β-di-[5-iso-butyl-benzoxazolyl - (2)(2')] - styrene represented by the formula:

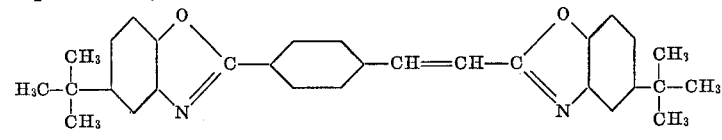

6. p-[5-methyl-benzoxazolyl-(2)]-β-[5'-iso-octyl-benzoxazolyl-(2')]-styrene represented by the formula:

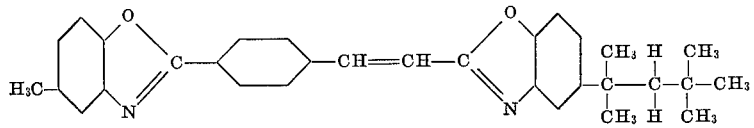

7. A di-arylene azolyl-styrene compound of the formula:

in which R is branched chain alkyl having 4 to 8 carbon atoms and R' is a member selected from the group consisting of hydrogen and alkyl having 1 to 12 carbon atoms.

References Cited

UNITED STATES PATENTS

| | | | |
|---|---|---|---|
| 2,985,661 | 5/1961 | Hein et al. | 260—240X |
| 3,147,253 | 9/1964 | Lizuka et al. | 260—240E |

FOREIGN PATENTS

| | | | |
|---|---|---|---|
| 1,358,515 | 3/1964 | France | 260—240CA |
| 631,859 | 5/1963 | Belgium | 260—240CA |

OTHER REFERENCES

Cheronis et al.: "Semimicro Qualitative Organic Analysis," pp. 146 and 311–312, Thomas Y. Crowell Co., New York, 1947.

JOHN D. RANDOLPH, Primary Examiner

U.S. Cl. X.R.

106—176; 117—33.5; 252—152, 301.2; 260—37, 78, 89.5, 92.8, 93.5, 93.7, 94.9, 304, 307, 309.2